(12) United States Patent
Naito et al.

(10) Patent No.: US 7,195,683 B2
(45) Date of Patent: Mar. 27, 2007

(54) SELF-SEAL TIRE AND ITS PRODUCING METHOD

(75) Inventors: Mitsuru Naito, Hiratsuka (JP); Hidekazu Takeyama, Hiratsuka (JP); Satoshi Makino, Wako (JP); Yasuhiro Miyatani, Wako (JP); Takayuki Toyoshima, Wako (JP)

(73) Assignees: The Yokohama Rubber Co., Ltd. (JP); Honda Giken Kogyo Kabushiki Kaisha (JP)

( * ) Notice: Subject to any disclaimer, the term of this patent is extended or adjusted under 35 U.S.C. 154(b) by 277 days.

(21) Appl. No.: 10/492,656

(22) PCT Filed: Oct. 18, 2002

(86) PCT No.: PCT/JP02/10843

§ 371 (c)(1),
(2), (4) Date: Apr. 14, 2004

(87) PCT Pub. No.: WO03/076214

PCT Pub. Date: Sep. 18, 2003

(65) Prior Publication Data

US 2004/0256042 A1    Dec. 23, 2004

(30) Foreign Application Priority Data

Mar. 8, 2002    (JP) .............................. 2002-063320

(51) Int. Cl.
*B29C 73/16*    (2006.01)
*B60C 19/12*    (2006.01)

(52) U.S. Cl. ...................... 156/115; 152/504; 156/126

(58) Field of Classification Search ........ 152/502–505, 152/508; 156/115, 126
See application file for complete search history.

(56) References Cited

U.S. PATENT DOCUMENTS

| | | | | |
|---|---|---|---|---|
| 4,919,183 A | * | 4/1990 | Dobson | 152/502 |
| 2002/0036042 A1 | * | 3/2002 | Takeyama et al. | 152/502 |

FOREIGN PATENT DOCUMENTS

| | | | | |
|---|---|---|---|---|
| EP | 0 021 255 A1 | 1/1981 | | |
| JP | 52-091903 A1 | 7/1977 | | |
| JP | 52-091903 U1 | 7/1977 | | |
| JP | 53-050905 A1 | 4/1978 | | |
| JP | 53-050905 U1 | 4/1978 | | |
| JP | 54-006206 A1 | 1/1979 | | |
| WO | WO88/06539 A1 | * | 9/1988 | 152/508 |
| WO | WO-02/085649 A1 | 10/2002 | | |

OTHER PUBLICATIONS

Derwent Abstract for JP 54-6206, Jan. 18, 1979.*
International Search Report for PCT/JP02/10843 mailed on Jan. 28, 2003.
Japanese Office Action to co-pending application mailed on Aug. 24, 2004.

* cited by examiner

*Primary Examiner*—Geoffrey L. Knable
(74) *Attorney, Agent, or Firm*—Rader, Fishman & Grauer PLLC

(57) ABSTRACT

A self-sealing tire according to the present invention includes a pneumatic tire and a puncture sealing layer disposed over a whole tire inner wall surface from one shoulder portion to the other shoulder portion of the pneumatic tire. The puncture sealing layer comprises an annular sponge layer which is impregnated with an adhesive so as to be exposed on a radially outer surface side thereof, and a bonding layer of an adhesive which is provided on a radially outer surface of the sponge layer and is adhered to the tire inner wall surface. The sponge layer is provided in a compressed state. The puncture sealing layer is press attached to the tire inner wall surface by a recovery force of the compressed sponge layer.

6 Claims, 3 Drawing Sheets

SELF-SEAL TIRE AND ITS PRODUCING METHOD

TECHNICAL FIELD

The present invention relates to a self-sealing tire and manufacturing method of the same, having a self-sealing function of sealing a puncture to prevent air from leaking outside the tire when it blows out by a nail or the like penetrating its crown portion during traveling of a vehicle.

TECHNICAL BACKGROUND

With the diffusion of highways, the demand for tires having a self-sealing function has been increasing day by day, and various self-sealing tires with a puncture sealing layer have been proposed heretofore. Conventionally, there has been proposed, for example, a self-sealing tire in which a high viscosity adhesive is applied as a sealing material to the inner surface of the tire crown portion to form a puncture sealing layer. The tire of this type, however, involves a problem that, when the tire turns at a high speed, the adhesive can not seal a puncture in the vicinity of the shoulder portions, because it flows to the center side of the crown portion by a centrifugal force.

Conventionally, there has been proposed, for example, a self-sealing tire in which a high viscosity adhesive is applied as a sealing material to the inner surface of the tire crown portion to form a puncture sealing layer.

The tire of this type, however, involves a problem that, when the tire turns at a high seed, the adhesive can not seal a puncture in the vicinity of the shoulder portions, because it flows to the center side of the crown portion by a centrifugal force.

Japanese Patent Laid-open No. 1979-6206 discloses a self-sealing tire in which a sponge layer impregnated with an adhesive similar to the aforementioned is affixed to the inner surface of the tire crown portion to form a puncture sealing layer. The puncture sealing layer of this tire is formed such that, after attaching a sponge layer to the tire inner surface, an adhesive is impregnated into the sponge layer from one surface thereof by means of press rollers with the tire being rotated.

Consequently, in order to fully impregnate the sponge layer with the adhesive so that it reaches the tire inner surface, it is necessary to turn the tire at a low speed and to provide a high pressing force. As a result, the working time for impregnation of the adhesive increases, thereby deteriorating workability.

Since the adhesive is exposed on the surface of the sponge layer, dust and foreign object stick thereto during transporting, stocking and the like, thereby deteriorating its appearance, and the adhesive adheres to a hand of the operator and equipment during handling of the tire, thereby making it bad to handle the tire.

DISCLOSURE OF THE INVENTION

It is an object of the present invention to provide a self-sealing tire and a manufacturing method thereof, which is excellent in handling, prevents an adhesive from moving during traveling of a vehicle, improves workability in forming a puncture sealing layer, and does not deteriorate its appearance.

In order to achieve the aforementioned object, a self-sealing tire according to the present invention includes a pneumatic tire and a puncture sealing layer disposed over a whole tire inner wall surface from one shoulder portion to the other shoulder portion of the pneumatic tire, the puncture sealing layer comprising an annular sponge layer which is impregnated with an adhesive so as to be exposed on a radially outer surface side thereof, and a bonding layer of an adhesive which is provided on a radially outer surface of the sponge layer and is adhered to the tire inner wall surface, the sponge layer being provided in a compressed state, and the puncture sealing layer being press attached to the tire inner wall surface by a recovery force of the compressed sponge layer.

A self-sealing tire manufacturing method according to the present invention, in which the self-sealing tire includes a pneumatic tire and a puncture sealing layer disposed over a whole tire inner wall surface from one shoulder portion to the other shoulder portion of the pneumatic tire, comprises the steps of: impregnating an annular sponge layer with an adhesive from a radially outer surface side thereof to form an adhesive impregnated sponge layer so that the adhesive is exposed on the radially outer surface side; forming a bonding layer made of an adhesive on a radially outer surface of the adhesive impregnated sponge layer to form a puncture sealing layer; and press attaching the puncture sealing layer onto the tire inner wall surface via the bonding layer by a recovery force of the sponge layer which has compressed.

Another self-sealing tire manufacturing method according to the present invention, in which the self-sealing tire includes a pneumatic tire and a puncture sealing layer disposed over a whole tire inner wall surface from one shoulder portion to the other shoulder portion of the pneumatic tire, comprises the steps of: impregnating an annular sponge layer with an adhesive from a radially outer surface side thereof to form an adhesive impregnated sponge layer so that the adhesive is exposed on the radially outer surface side, and to simultaneously form a bonding layer made of the adhesive on a radially outer surface of the adhesive impregnated sponge layer integrally therewith, thereby forming a puncture sealing layer; and press attaching the puncture sealing layer onto the tire inner wall surface via the bonding layer by a recovery force of the sponge layer which has compressed.

According to the present invention described above, since the adhesive for sealing a puncture is impregnated into the sponge layer, flow of the adhesive by a centrifugal force to the center side of the crown portion can be prevented during traveling of a vehicle. A puncture, therefore, can be sealed in the vicinity of the shoulders.

Since the adhesive is impregnated so as to be exposed on the radially outer surface side of the sponge layer and not to be exposed on the radially inner surface side thereof, sticking of dust and foreign object to the radially inner surface of the sponge layer can be avoided during transporting, stocking and the like. As a result, the deterioration of appearance can be avoided. Also, the adhesive does not stick to a hand of the operator and equipment during handling of the tire, thereby facilitating the tire handling.

Since the adhesive is previously impregnated into the sponge layer and the puncture sealing layer is press attached to the tire inner wall surface by a recovery force of the compressed sponge layer, the puncture sealing layer can be easily and tightly bonded to the tire inner wall surface without press attachment operation by application of a high compression force from the outside by means of press rollers or the like. Accordingly, an improved workability can be obtained.

BEST MODES FOR CARRYING OUT THE INVENTION

The embodiments of the present invention will be described below with reference to the drawings. In respective drawings, the same components are assigned the same symbols, and duplicated description will be omitted.

Figure 1:
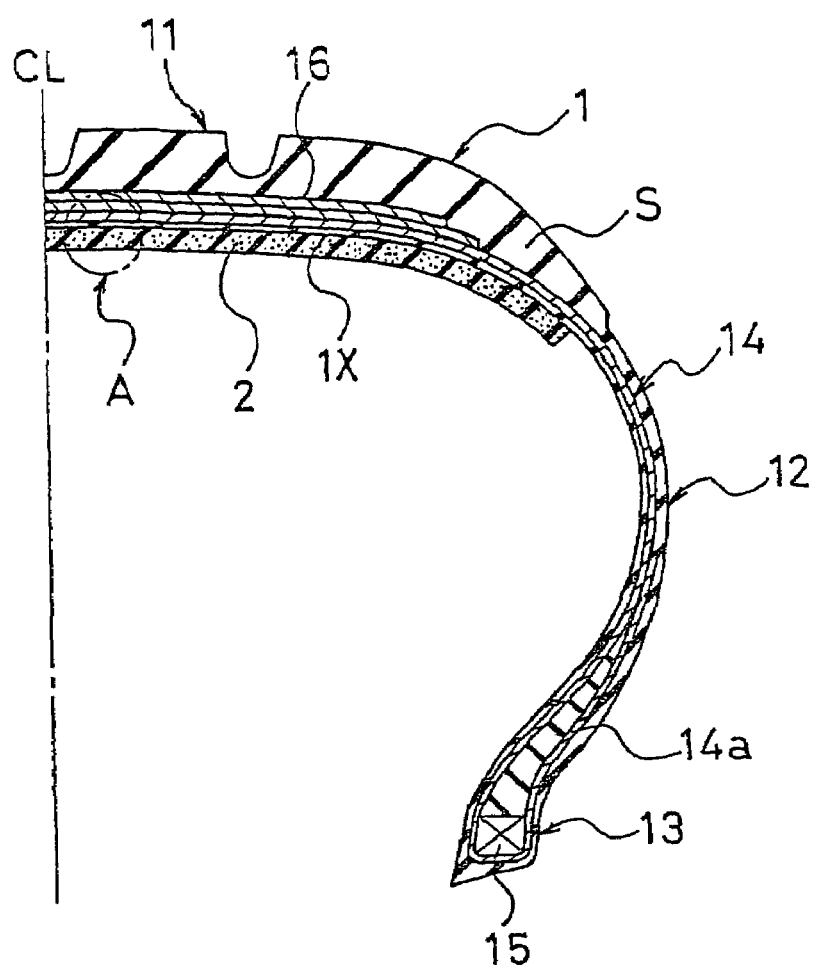
FIG. 1 is a cross-sectional view of one-half of a self-sealing tire according to the present invention, taken along the tire meridian.

Referring to FIG. 1, the self-sealing tire of the present invention comprises a pneumatic tire 1 and a puncture sealing layer 2 attached to an entire tire inner wall surface 1X from one shoulder portion S to the other shoulder portion S of the pneumatic tire 1.

The pneumatic tire 1 has a crown portion 11, right and left sidewall portions 12, and right and left bead portions 13. Provided between the right and left bead portions 13 are a carcass layer 14, both end portions 14a of which are turned axially outwardly around a bead core 15 embedded in each of the bead portions 13. A plurality of belt layers 16 are disposed radially outwardly of the carcass layer 14 in the crown portion 11. The tire centerline is designated by CL.

Figure 2:
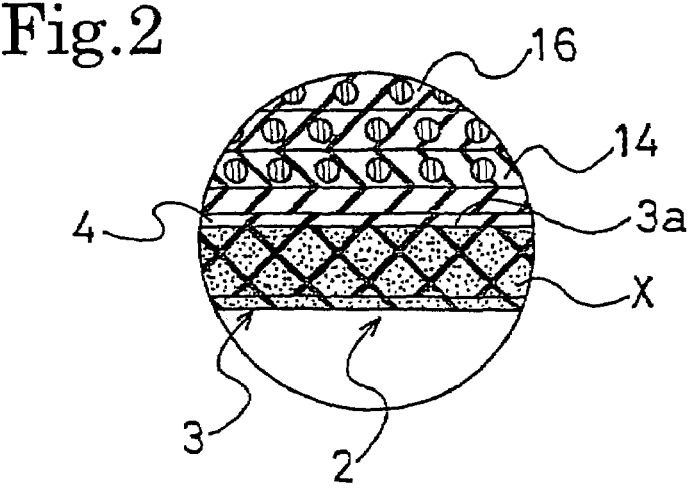
FIG. 2 is an enlarged section of the part indicated by the arrow A in FIG. 1.

The puncture sealing layer 2 is formed in an annular shape and, as shown in FIG. 2, comprises a sponge layer 3 impregnated with a high viscosity adhesive X as sealing material so that it is not exposed on the radially inner surface side of the sponge layer but is exposed on the radially outer surface side thereof, and an bonding layer 4, made of an adhesive, which is provide on the radially outer surface 3a of the sponge layer 3 and bonds to the tire inner wall surface 1X.

The adhesive used for the bonding layer 4 is composed of the same high viscosity adherent composition as the adhesive X impregnated into the sponge layer 3, and the bonding layer 4 is integrally formed on the radially outer surface 3a of the sponge layer 3.

Figure 3:
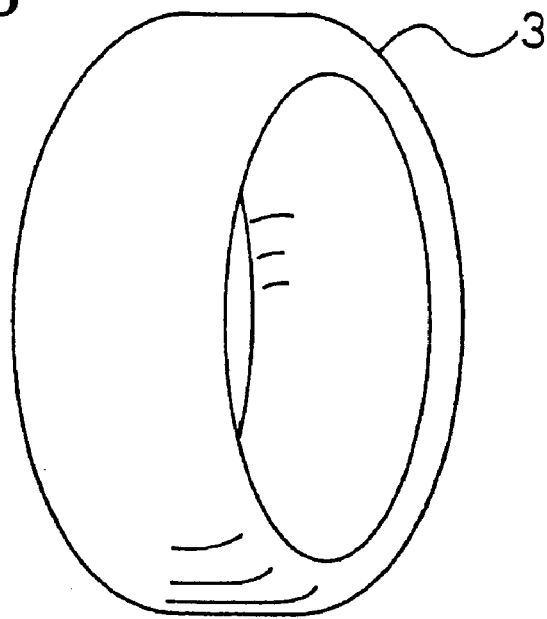
FIG. 3 is a perspective view of an annular sponge layer prior to attachment of a puncture sealing layer.

The sponge layer 3, which is annularly shaped and is elastic, is arranged such that the peripheral length (outer circumference length) Ls of the radially outer surface of the sponge layer 3 prior to attachment of the puncture sealing layer 2 to the pneumatic tire 1 (see FIG. 3) is longer than the tire inner circumference length Lt of the tire inner wall surface 1X between the shoulder portions S to which the puncture sealing layer 2 is attached, the sponge layer 3 being attached in a radially inwardly compressed state, thereby press attaching the puncture sealing layer 2 to the tire inner wall surface 1X by a restoring force of the sponge layer 3 acting radially outwards.

The self-sealing tire having the aforementioned puncture sealing layer 2 is manufactured as follows.

Figure 4:
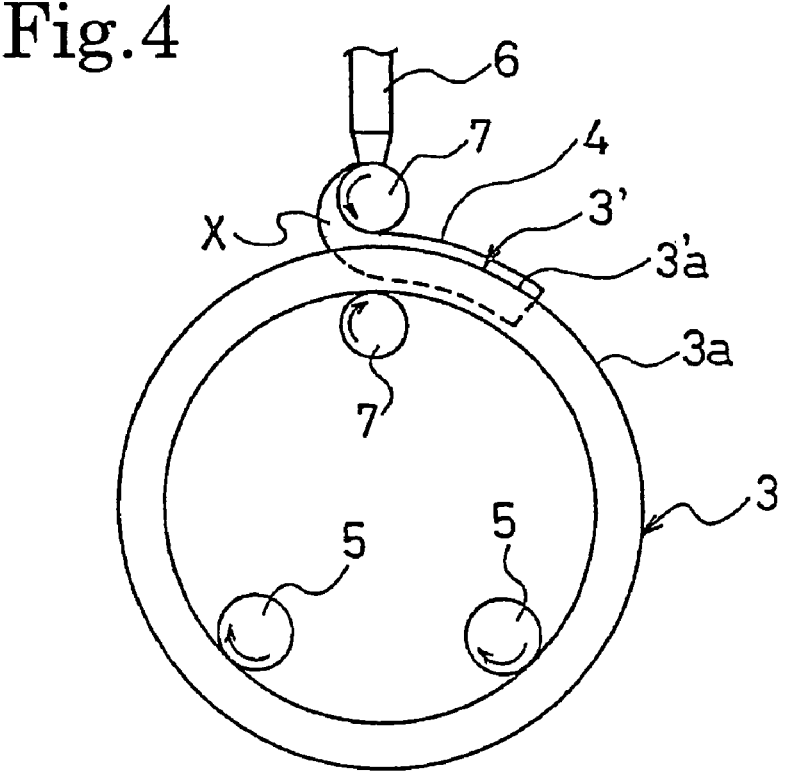
FIG. 4 is a schematic view showing a step of forming a puncture sealing layer in a self-sealing tire manufacturing method according to the present invention.

As shown in FIG. 4, adhesive X discharged from a discharge port 6 of an adhesive extruder is consecutively press attached by means of a pair of rollers 7, 7 onto the radially outer surface 3a of the annular preformed sponge layer 3 rotated by rollers 5, 5 so as to round the radially outer surface 3a. The adhesive X is impregnated into the sponge layer 3 from the radially outer surface 3a during this process, thereby forming an adhesive impregnated sponge layer 3' which has the adhesive X not exposed on the radially inner surface side, but exposed on the radially outer surface side thereof, and simultaneously forming the bonding layer 4 made of the adhesive X on the radially outer surface 3'a of the adhesive impregnated sponge layer 3'(the radially outer surface 3a of the sponge layer 3) to form the puncture sealing layer 2.

Next, the obtained puncture sealing layer 2 is compressed and introduced inside the pneumatic tire 1, and is then decompressed. The puncture sealing layer 2 is pressed to the tire inner wall surface 1X with the bonding layer 4 being stuck closely thereto by a restoring force of the sponge layer 3 trying to restitute to its original size, whereby the puncture sealing layer 2 is press attached and tightly bonded to the tire inner wall surface 1X without press attaching the puncture sealing layer 2 thereto by applying a high compression force from the outside.

According to the self-sealing tire of the present invention mentioned above, flow of the adhesive X by a centrifugal force can be prevented during traveling of a vehicle, since the adhesive X used for the puncture sealing layer 2 is impregnated into the sponge layer 3. Consequently, a good puncture sealing ability can be achieved even in the vicinity of the shoulder portions S because of no flow of the adhesive X to the center side of the crown portion 11.

Since the adhesive X is impregnated so as to be exposed on the radially outer surface side of the sponge layer 3 and not to be exposed on the radially inner surface side thereof, dust and foreign object are prevented from sticking during transporting, stocking and the like, thus not deteriorating the appearance. Also, the adhesive does not stick to a hand of the operator and equipment during handling of the tire, thereby improving the handling performance.

Since the adhesive X is previously impregnated into the sponge layer 3 and the puncture sealing layer 2 is press attached to the tire inner wall surface 1X by a recovery force of the compressed sponge layer 3, the puncture sealing layer 2 can be easily and tightly bonded to the tire inner wall surface 1X without press attachment operation by application of a high compression force from the outside by means of press rollers or the like. Accordingly, a good workability can be obtained.

Figure 5:
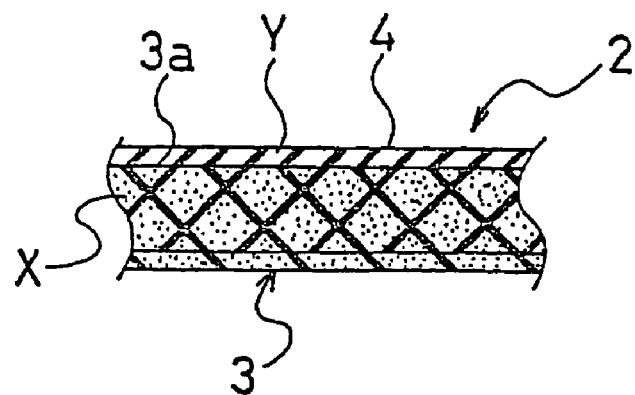
FIG. 5 is an enlarged section showing a main part of another puncture sealing layer to be attached to a self-sealing tire according to the present invention.

FIG. 5 shows another puncture sealing layer used for the self-sealing tire of the present invention. This puncture sealing layer 2 has a bonding layer 4 which is composed of a high viscosity adhesive Y made of an adherent composition different from the adhesive X and which has a high viscosity sealing capacity.

Figure 6:
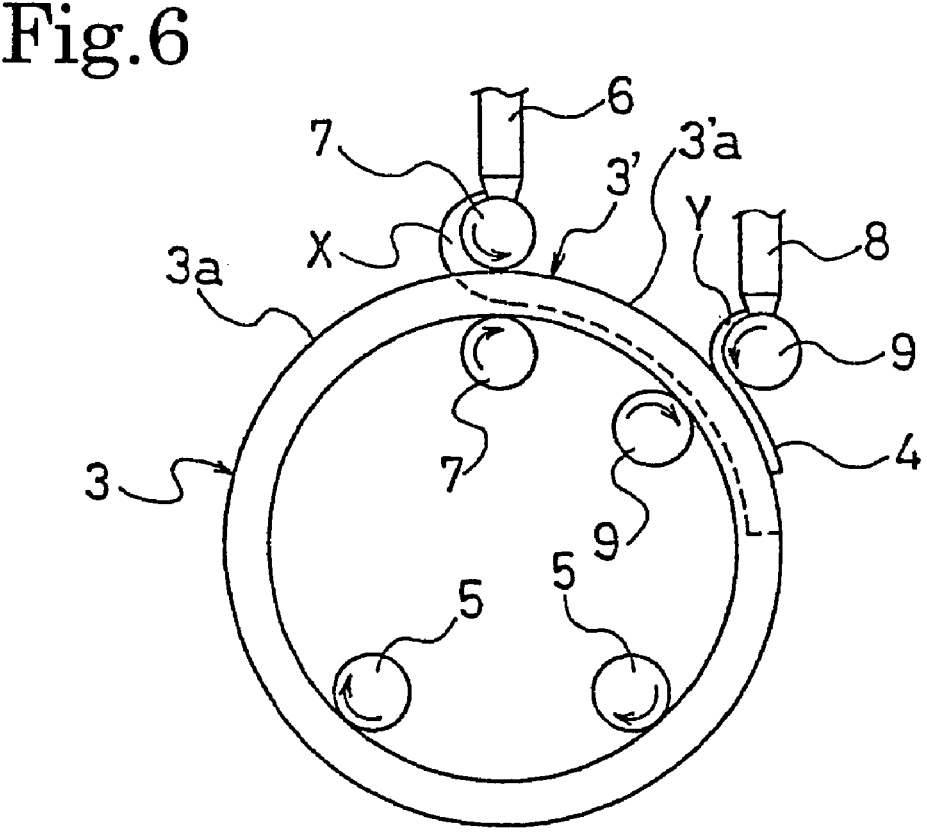
FIG. 6 is a schematic view showing a step of forming the puncture sealing layer of FIG. 5.

Such a puncture sealing layer 2 is formed as follows. As shown in FIG. 6, adhesive X discharged from a discharge port 6 of a first adhesive extruder is consecutively press attached by means of a pair of rollers 7, 7 onto an radially outer surface 3a of an annular sponge layer 3 rotated by rollers 5, 5. The adhesive X is impregnated into the sponge layer 3 from the radially outer surface 3a, thereby sequentially forming an adhesive impregnated sponge layer 3' such that the adhesive X is not exposed to the radially inner surface side but exposed to the radially outer surface side thereof.

Next, adhesive Y discharged from a discharge port 8 of a second adhesive extruder is consecutively press attached onto the radially outer surface 3a' of the adhesive impregnated sponge layer 3' by means of a pair of rotating rollers 9, 9. The bonding layer 4 is sequentially formed on the radially outer surface 3a'. The puncture sealing layer 2 is formed by applying the adhesives X, Y so that they round the sponge layer 3.

The puncture sealing layer 2 formed as mentioned above is bonded to the tire inner wall surface 1X in a similar manner to that described above.

Effects similar to the aforementioned can be obtained even though the bonding layer 4 of the puncture sealing layer 2 is composed of the adhesive Y different from the adhesive X as illustrated above.

The puncture sealing layer 2 shown in FIG. 5 may be formed by formation of the bonding layer 4 on the tire inner wall surface 1X beforehand, and by adhesion of an adhesive impregnated sponge layer 3' to the bonding layer 4. It should be appreciated that the bonding layer 4 formed on the tire inner wall surface may be formed using the adhesive X.

In the present invention, it is preferable that a relationship between the outer circumference length Ls of the sponge layer 3 and the tire inner circumference length Lt of the tire inner wall surface 1X be set to 1.1 Lt≦Ls≦1.3 Lt on the tire centerline CL.

If the outer circumference length Ls of the sponge layer 3 is less than 1.1 Lt, it is difficult to firmly adhere the puncture sealing layer 2 to the tire inner wall surface 1X by the recovery force of the sponge layer 3, deteriorating the puncture sealing ability. If it is larger than 1.3Lt, the circumference length of the sponge layer 3 is so long that the sponge layer 3 is partially bent radially inward, creating an insufficiently adhered part, and when a puncture happens in the part by a nail or the like, the part peels off from the tire inner wall face 1X, causing the deterioration of a puncture sealing ability.

The thickness of the sponge layer 3 prior to attachment of the puncture sealing layer and the impregnation depth of the adhesive X with which the sponge layer 3 is impregnated may conveniently be selected according to the size of a pneumatic tire to be attached. From the viewpoint of prevention of excessive increase in tire weight, and of a good sealing ability, it is preferable to set the thickness of the sponge layer 3 to be 5 to 15 mm, and the impregnation depth of the adhesive X to be 4 to 12 mm. The impregnation amount of adhesive X is preferably 0.1 to 0.5 g/cm$^3$.

Material composing the aforementioned sponge layer 3 may preferably include a rubber having a continuous bubble into which the adhesive X can be impregnated, and a foam resin formed of polyurethane, nylon or the like. It is desirable to employ a continuous bubble type ether system polyurethane foam.

As adherent composition used for the adhesive X, an elastomer blended with an amorphous polyolefin, paraffin oil, or tackifier such as petroleum resin or low molecular weigh oligomer which is, for example, liquid polybutene may preferably be used. The elastomer may preferably be, for instance, at least one type of elastomer selected from a group of butyl rubber, polyisobutylene, natural rubber, isoprene rubber and polybutene in order to enhance the air impermeability of the tire in a normal use state with no puncture.

Also, in case of forming the bonding layer 4 with the adhesive X, the aforementioned elastomer blended with a tackifier such as petroleum resin or low molecular weigh oligomer which is, for example, liquid polybutene may be used as the adhesive.

The adherent composition used for the adhesive Y may be one as used in the case of forming the bonding layer 4 with the adhesive X.

An appropriate crosslinking agent or vulcanizing agent may be blended with the adhesive X, Y in order to provide heat resistance for the adhesive. For instance, in the case of using butyl rubber or polybutene, p-quinonedioxime or the like may be blended.

It is preferable that the adhesives X, Y be made of an adherent composition not containing solvent, and that the viscosity thereof is adjusted to be about 10000Pa·s.

EXAMPLE 1

Tires of the present invention and of the comparison were manufactured, having a tire size of 205/65R15 and a tire construction shown in FIG. 1, the tire of the present invention having a puncture sealing layer which was press attached to the tire inner wall surface by a restoring force of the sponge layer with its outer circumference length Ls longer than the tire inner circumference length Lt of the tire inner wall surface, and the comparative tire having a puncture sealing layer which was attached to the tire inner wall surface with the sponge layer thereof having an outer circumference length Ls equal to the tire inner circumference length Lt of the tire inner wall surface.

The outer circumference length Ls of the sponge layer of the present invention at a position corresponding to that of the tire centerline prior to attachment was 1.2 times longer than the tire inner circumference length Lt of the tire inner wall surface on the tire centerline.

Each sponge layer used for the present invention and comparative tires was composed of a continuous bubble type ether system polyurethane foam, and a composition having butyl rubber and liquid polybutene as main components was used for the adhesive.

The thickness of each sponge layer used for the present invention and comparative tires was 10 mm and the adhesive impregnation depth was 8 mm.

The test tires were each attached to a rim having a size of 15×6JJ, with the tire air pressure being set to 200 kPa, and a puncture sealing ability evaluation test was performed under the following measurement method, thereby obtaining the results shown in Table 1.

PUNCTURE SEALING ABILITY

A nail was stuck through the crown portion and puncture sealing layer of each test tire, and then extracted, and each test tire was left as it was for 24 hours. Thereafter the air pressure of each test tire was measured, and each result was evaluated in two levels of ○ and X. ○ means that there was no air leak, and X means that air leak took place.

TABLE 1

|  | Present invention tire | Comparative tire |
| --- | --- | --- |
| Puncture sealing ability | ○ | X |

A can be seen from Table 1, the present invention tire having a puncture sealing layer which was press attached to the tire inner wall surface by a restoring force of the sponge layer can demonstrate a good puncture sealing ability.

EXAMPLE 2

Test tires 1 to 5 were respectively manufactured, having the same tire size and construction as in Example 1, the test tires each having a puncture sealing layer disposed on the tire inner wall surface, the outer circumference length Ls of each sponge layer at a position corresponding to that of the tire centerline prior to attachment with respect to the tire inner circumference length Lt of the tire inner wall surface at a position of the tire centerline being changed as shown in Table 2.

Each sponge layer used for the test tires was composed of a continuous bubble type ether system polyurethane foam, and a composition having butyl rubber and liquid polybutene as main components was used for the adhesive. The thicknesses t of the sponge layers and the adhesive impregnation depths h were shown in Table 2, respectively.

A puncture sealing ability evaluation test of each test tire was carried out as in Example 1, thereby obtaining the results shown in Table 2.

TABLE 2

|  | Test tire 1 | Test tire 2 | Test tire 3 | Test tire 4 | Test tire 5 |
|---|---|---|---|---|---|
| Outer circumference length Ls | 1.05 Lt | 1.10 Lt | 1.20 Lt | 1.30 Lt | 1.40 Lt |
| Thickness t (mm) | 10 | 10 | 10 | 10 | 10 |
| Depth h (mm) | 8 | 6 | 8 | 8 | 8 |
| Puncture sealing ability | X | ◯ | ◯ | ◯ | X |

From Table 2, it is appreciated that the outer circumference length Ls of the sponge layer may be 1.1 to 1.3 times longer than the tire inner circumference length Lt of the tire inner wall surface.

As mentioned above, the present invention can prevent the adhesive from flowing to the center side of the crown portion by a centrifugal force generated during traveling of a vehicle, since the adhesive used for the puncture sealing layer is impregnated into the sponge layer.

Since the adhesive is not exposed on the radially inner surface side of the sponge layer, but is exposed on the radially outer surface side thereof, the deterioration of appearance due to sticking of dust and foreign object during transporting, stocking and the like does not occur, and a good handling performance can be obtained.

Since the adhesive is previously impregnated into the sponge layer and the puncture sealing layer is press attached to the tire inner wall surface by a recovery force of the compressed sponge layer, the puncture sealing layer can be easily and tightly bonded to the tire inner wall surface without press attachment operation by application of a high compression force from the outside by means of press rollers or the like, thereby attaining a good workability.

INDUSTRIAL APPLICABILITY

The present invention having the aforementioned excellent effects can be used very effectively for a self-sealing tire having a self-sealing function of sealing a puncture to prevent air from leaking outside the tire when it blows out by a nail or others penetrating its crown portion during traveling of a vehicle.

What is claimed is:

1. A method of manufacturing a self-sealing tire having a pneumatic tire and a puncture sealing layer disposed over a whole tire inner wall surface from one shoulder portion to the other shoulder portion of the pneumatic tire, comprising the steps of:

press attaching a first adhesive discharged from a discharge port of a first adhesive extruder by means of rollers onto a radially outer surface of a rotating annular sponge layer around an entire circumference of the annular sponge layer consecutively, thereby impregnating the annular sponge layer with the first adhesive from a radially outer surface of the annular sponge layer to form an adhesive impregnated sponge layer with the first adhesive not exposed on a radially inner surface of the annular sponge layer but is exposed on the radially outer surface of the annular sponge layer;

press attaching a second adhesive discharged from a discharge port of a second adhesive extruder by means of rollers onto a radially outer surface of the adhesive impregnated sponge layer rotating around an entire circumference of the adhesive impregnated sponge layer consecutively, thereby forming a bonding layer made of the second adhesive on the radially outer surface of the adhesive impregnated sponge layer to form a puncture sealing layer;

compressing the puncture sealing layer; and attaching the compressed puncture sealing layer onto the tire inner wall surface via the bonding layer, wherein a recovery force of the annular sponge layer is adapted to attach the puncture sealing layer onto the tire inner wall surface.

2. The self-sealing tire manufacturing method of claim 1, wherein a relationship between an outer circumference length Ls of the sponge layer at a position corresponding to that of the tire centerline of the pneumatic tire prior to attachment of the puncture sealing layer and a tire inner circumference length Lt of the tire inner wall surface at a position of the tire centerline is set to 1.1 Lt≦Ls≦1.3 Lt.

3. The self-sealing tire manufacturing method of claim 1 or 2, wherein the adhesives are made of an adherent composition not containing solvent.

4. A method of manufacturing a self-sealing tire having a pneumatic tire and a puncture sealing layer disposed over a whole tire inner wall surface from one shoulder portion to the other shoulder portion of the pneumatic tire, comprising the steps of:

press attaching an adhesive discharged from a discharge port of an adhesive extruder by means of rollers onto a radially outer surface of a rotating annular sponge layer around an entire circumference of the annular sponge layer consecutively, thereby impregnating the annular sponge layer with the adhesive from a radially outer surface of the annular sponge layer to form an adhesive impregnated sponge layer with the adhesive not exposed on a radially inner surface of the annular sponge layer but exposed on the radially outer surface side of the annular sponge layer, and to simultaneously form a bonding layer made of the adhesive on a radially outer surface of the adhesive impregnated sponge layer integrally therewith, thereby forming a puncture sealing layer;

compressing the puncture sealing layer; and attaching the compressed puncture sealing layer onto the tire inner wall surface via the bonding layers;

wherein a recovery force of the annular sponge layer is adapted to attach the puncture sealing layer onto the tire inner wall surface.

5. The self-sealing tire manufacturing method of claim 4, wherein a relationship between an outer circumference length Ls of the sponge layer at a position corresponding to that of the tire centerline of the pneumatic tire prior to attachment of the puncture sealing layer and a tire inner circumference length Lt of the tire inner wall surface at a position of the tire centerline is set to $1.1\ Lt \leq Ls \leq 1.3\ Lt$.

6. The self-sealing tire manufacturing method of claim 4 or 5, wherein the adhesive is made of an adherent composition not containing solvent.

* * * * *